(12) United States Patent
Hoffmann et al.

(10) Patent No.: US 12,442,663 B2
(45) Date of Patent: Oct. 14, 2025

(54) DISPLACEMENT SENSOR FOR CONTACTLESS MEASUREMENT OF A RELATIVE POSITION, PRODUCTION METHOD FOR A MAGNETIC FIELD SENSOR ARRANGEMENT AND MAGNETIC FIELD SENSOR

(71) Applicant: TE Connectivity Germany GmbH, Bensheim (DE)

(72) Inventors: Eric Hoffmann, Schwetzingen (DE); Simon Scherner, Speyer (DE); Oliver Steeg, Lampertheim (DE); Jochen Zachow, Glashutten-Oberems (DE)

(73) Assignee: TE Connectivity Germany GmbH, Bensheim (DE)

( * ) Notice: Subject to any disclaimer, the term of this patent is extended or adjusted under 35 U.S.C. 154(b) by 151 days.

(21) Appl. No.: 16/364,706

(22) Filed: Mar. 26, 2019

(65) Prior Publication Data

US 2019/0219421 A1    Jul. 18, 2019

Related U.S. Application Data

(63) Continuation of application No. PCT/EP2017/074266, filed on Sep. 25, 2017.

(30) Foreign Application Priority Data

Sep. 27, 2016 (DE) ............ 10 2016 218 530.6

(51) Int. Cl.
*G01D 5/14* (2006.01)
*G01D 11/24* (2006.01)
*G01D 21/00* (2006.01)

(52) U.S. Cl.
CPC ........... *G01D 5/145* (2013.01); *G01D 11/245* (2013.01); *G01D 21/00* (2013.01)

(58) Field of Classification Search
CPC ........ G01D 5/142; G01D 5/145; G01D 5/147; G01D 5/16; G01D 5/165; G01D 5/2013;
(Continued)

(56) References Cited

U.S. PATENT DOCUMENTS 5,963,028 A * 10/1999 Engel ................. G01R 33/07
174/536
7,030,604 B1 * 4/2006 Dmytriw ............. G01D 3/032
324/207.12
(Continued)

FOREIGN PATENT DOCUMENTS

DE     102010034994 A1    2/2012
DE     102012205902 A1    10/2013
(Continued)

OTHER PUBLICATIONS

Carsten Pinkle, The Why and How of Differential Signaling, Nov. 16, 2016, obtained from https://www.allaboutcircuits.com/technical-articles/the-why-and-how-of-differential-signaling/#:~: text=Differential%20signaling%20allows%20us%20to,noise%2C%20and%20higher%20data%20rates. (Year: 2016).*

(Continued)

*Primary Examiner* — David M Schindler
(74) *Attorney, Agent, or Firm* — Barley Snyder

(57) ABSTRACT

A displacement sensor comprises a magnetic field source generating a magnetic field and a magnetic field sensor arrangement adapted to contactlessly detect a relative position of the magnetic field source with respect to the magnetic field sensor arrangement. The magnetic field sensor arrangement includes a first magnetic field sensor adapted to generate a first position signal and a second magnetic field sensor adapted to generate a second position signal. Each of the first magnetic field sensor and the second magnetic field sensor has a magnetic field probe adapted to detect a magnetic flux density of the magnetic field, an evaluation (Continued)

unit for evaluating an output signal of the magnetic field probe, and a communication interface for emitting and receiving a plurality of communication signals. The first magnetic field sensor and the second magnetic field sensor are connected to each other via a data bus for transmitting the communication signals.

7 Claims, 9 Drawing Sheets

(58) Field of Classification Search
CPC .. G01D 5/2046; G01D 5/2216; G01D 5/2291; G01D 11/245; G01D 21/00; G01B 7/14; G01B 7/30; G01R 33/0047; G01R 33/0052; G01R 33/06; G01R 33/07; G01R 33/072; G01R 33/075; G01R 33/077; G01R 33/09; G01R 33/091; G01R 33/093; G01R 33/095; G01R 33/096; G01R 33/098
See application file for complete search history.

(56) References Cited

U.S. PATENT DOCUMENTS

| | | | | |
|---|---|---|---|---|
| 7,825,845 | B1* | 11/2010 | Melanson | H03M 3/456 |
| | | | | 324/252 |
| 9,787,495 | B2* | 10/2017 | Vreeland | H04L 12/403 |
| 9,982,988 | B2 | 5/2018 | Schaaf | |
| 2003/0178710 | A1 | 9/2003 | Kang et al. | |
| 2003/0183024 | A1* | 10/2003 | Lohberg | B60T 15/54 |
| | | | | 73/865.9 |
| 2008/0007255 | A1* | 1/2008 | Johnson | G01D 5/147 |
| | | | | 324/207.24 |
| 2010/0109654 | A1* | 5/2010 | Schneider | G01D 5/20 |
| | | | | 324/207.2 |
| 2012/0206888 | A1* | 8/2012 | Schillinger | G01D 11/245 |
| | | | | 361/760 |
| 2012/0319682 | A1* | 12/2012 | Ausserlechner | G01R 33/072 |
| | | | | 324/252 |
| 2013/0335073 | A1 | 12/2013 | Deak et al. | |
| 2014/0297911 | A1 | 10/2014 | Kossira et al. | |
| 2015/0022192 | A1* | 1/2015 | Ausserlechner | G01R 33/022 |
| | | | | 324/207.25 |
| 2016/0334242 | A1* | 11/2016 | Ausserlechner | G01R 33/02 |

FOREIGN PATENT DOCUMENTS

| | | |
|---|---|---|
| DE | 102012205903 B4 | 1/2014 |
| DE | 102013009862 A1 | 12/2014 |
| EP | 2466269 A2 | 6/2012 |
| WO | 03019216 A1 | 3/2003 |

OTHER PUBLICATIONS

PCT Notification, Transmittal of The International Search Report and The Written Opinion of the International Searching Authority, Intl App. No. PCT/EP2017/074266, dated Dec. 22, 2017, 16 pages.
Machine translation the abstract of DE 102013009862, dated Dec. 18, 2014 1 page.
European Search Report, App. No. 19189660.4, dated Oct. 29, 2019, 9 pages.
www.enriquedelsol.com: "Complementary Encoder Signals to mitigate the electrical noise", dated Mar. 12, 2018, retrieved from the Internet: URL: https://enriquedelsol.com/2018/03/12/complementary-encoder-signals-to-mitigate-the-electrical-noise/#:~:text; pp. 1-5, [retrieved on Apr. 11, 2023], the whole document, 5 pp.
www.beckhoff.com/en-us/EtherCAT: "Increment-precise positioning with position encoders", dated Feb. 2012, retrieved from the Internet: URL: https://https://www.beckhoff.com/en-us/products/i-o/ethercat-terminals/el5xxx-position-measurement/el5021.html; pp. 1-7, [retrieved on Apr. 11, 2023], the whole document, 7 pp.

* cited by examiner

DISPLACEMENT SENSOR FOR CONTACTLESS MEASUREMENT OF A RELATIVE POSITION, PRODUCTION METHOD FOR A MAGNETIC FIELD SENSOR ARRANGEMENT AND MAGNETIC FIELD SENSOR

CROSS-REFERENCE TO RELATED APPLICATIONS

This application is a continuation of PCT International Application No. PCT/EP2017/074266, filed on Sep. 25, 2017, which claims priority under 35 U.S.C. § 119 to German Patent Application No. 102016218530.6, filed on Sep. 27, 2016.

FIELD OF THE INVENTION

The present invention relates to a displacement sensor and, more particularly, to a displacement sensor for contactless measurement of a relative position of a magnetic field source.

BACKGROUND

Linear movements are measured, for example, to control machine tools in pneumatics, in automation technology and robotics, as well as in the automotive sector. A contactless detection of movements has the advantage, inter alia, of being wear-free. Optical and magnetic contactless measuring methods are the most common of the contactless measuring methods. While the optical methods guarantee a very high level of accuracy by virtue of the small wavelength of the light, magnetic methods are far less sensitive to contamination and damage, in particular due to the fact that magnets and sensor components can be fully encapsulated in a non-magnetic hermetic protective material.

Various manufacturers offer displacement sensor systems in which the position of a displaceable permanent magnet is determined, for example, with the help of a two-dimensional or three-dimensional Hall-effect sensor. In this case, to detect the linear relative movements at a location, two magnetic field components which are perpendicular to each other are measured and their quotient is evaluated for position identification. This approach has the advantage that, in areas in which one field component assumes an extreme value and thus does not detect small displacements, the other field components respond all the more strongly such that equally high measuring accuracy is approximately high throughout the entire measuring range. Further, this principle is comparatively less sensitive to a variation of the absolute magnetic field strength, since relative values between the field components are used for position detection.

FIG. 13 shows an arrangement in which, for contactlessly detecting a linear movement, a magnetic field sensor 100, in particular a Hall-effect sensor, is fixedly assembled, for example on a housing wall, and detects the magnetic field of a movable permanent magnet 102. Corresponding to the north/south polarization along the movement direction of the permanent magnet 102, the component of the magnetic field which runs in the movement direction is designated magnetic field component Bz, and the component which runs transversely thereto is designated By. The entire measuring range in the z direction which is covered by the Hall-effect sensor 100 is indicated by the reference number 104.

FIG. 14 shows the curve of the components By and Bz of the magnetic flux density as a function of the location z of the permanent magnet 102. The zero position is the position in which the permanent magnet 102 and the sensor 100 are directly opposite each other.

The angle α, which can be calculated according to the following equation (1), is used as a measuring signal.

$$\alpha = \arctan\left(\frac{Bz}{By}\right) \quad \text{(Eqn. 1)}$$

The curve of the quantity $|\vec{B}|$ of the magnetic flux density is shown in FIG. 15 as a function of the location z. The vector quantity $|\vec{B}|$ of the magnetic flux density is calculated in a known manner from the individual components By and Bz according to the following equation (2). Corresponding calculation rules apply, as known to a person skilled in the art, when using other coordinate systems and also when adding a third magnetic field component Bx.

$$|\vec{B}| = \sqrt{By^2 + Bz^2} \quad \text{(Eqn. 2)}$$

As shown in FIG. 16, the angle α depends, up to a certain value comparatively linearly, on the position of the permanent magnet 102 with respect to the Hall-effect sensor 100. The currently measured characteristic is usually further linearized, as shown in FIG. 16 by the curve α_lin. This linearized curve α_lin then forms the output characteristic of the sensor 100. FIG. 17 shows the curve of the position signal OUT which is output by the sensor.

Most commercially available 3D Hall-effect sensors can only be operated in the presence of a sufficiently strong magnetic field. If the permanent magnet is located outside the range of detection of the sensor, a sensor signal is no longer obtainable. German patent DE 10 2012 205 903 B4 proposes that the magnetic field sensor which detects the position of the magnetic field source should have a plurality of magnetic field probes. Each of the magnetic field probes outputs a position signal, and this position signal is based on at least two spatial components of the magnetic flux density of the magnetic field. An external control and calculating unit is provided, which outputs a total output signal of the displacement sensor based on the plurality of position signals. Furthermore, a storage unit is provided which stores the individual position signals. The control and calculating unit decides, based on a calculated value of the magnetic flux density, which is measured at the location of the respective magnetic field probe, if a current position signal is to be output as the position signal, or if the previously stored position signal is to be output and the further calculation to be taken as a basis.

For some applications, the provision of a separate control and calculating unit is, however, not practical since the overall displacement sensor would become too cumbersome and prone to faults.

SUMMARY

A displacement sensor comprises a magnetic field source generating a magnetic field and a magnetic field sensor arrangement adapted to contactlessly detect a relative position of the magnetic field source with respect to the magnetic field sensor arrangement. The magnetic field sensor arrangement includes a first magnetic field sensor adapted to generate a first position signal and a second magnetic field sensor adapted to generate a second position signal. Each of the first magnetic field sensor and the second magnetic field sensor has a magnetic field probe adapted to detect a magnetic flux density of the magnetic field, an evaluation unit for evaluating an output signal of the magnetic field probe, and a communication interface for emitting and receiving a plurality of communication signals. The first magnetic field sensor and the second magnetic field sensor are connected to each other via a data bus for transmitting the communication signals.

BRIEF DESCRIPTION OF THE DRAWINGS

The invention will now be described by way of example with reference to the accompanying Figures, of which.

DETAILED DESCRIPTION OF THE EMBODIMENT(S)

The present invention will now be explained in greater detail using the exemplary embodiments depicted in the following figures. Identical parts are here provided with identical reference numbers and identical component names. Furthermore, individual features or combinations of features from the shown and described embodiments taken separately represent independent inventive solutions or solutions according to the invention.

Figure 13:
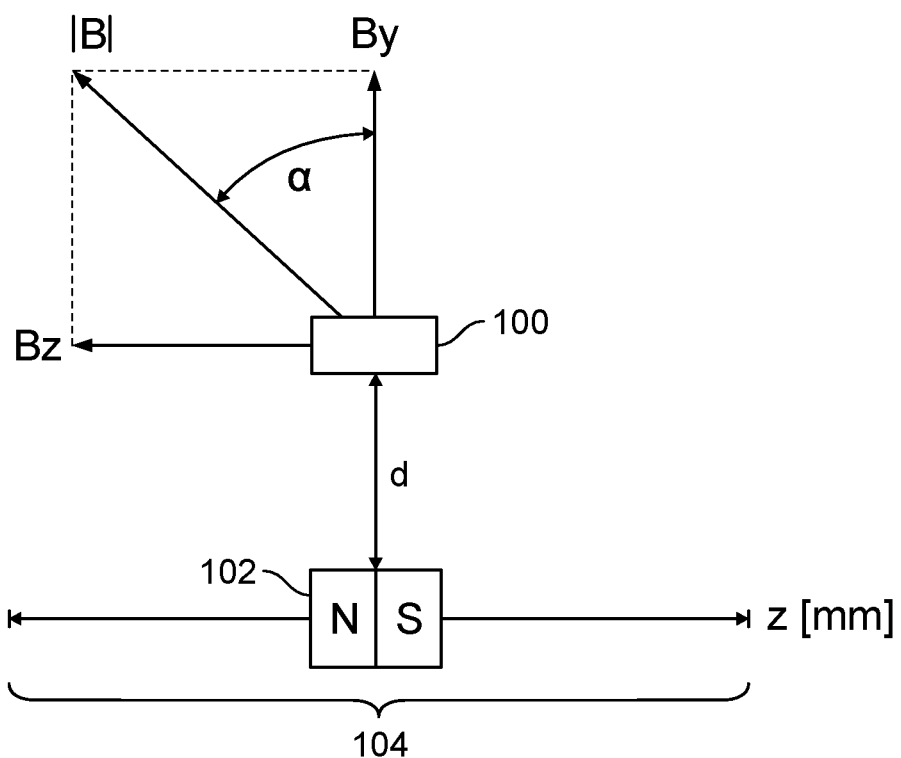
FIG. 13 is a schematic diagram of a Hall-effect sensor according to the prior art.
Figure 14:
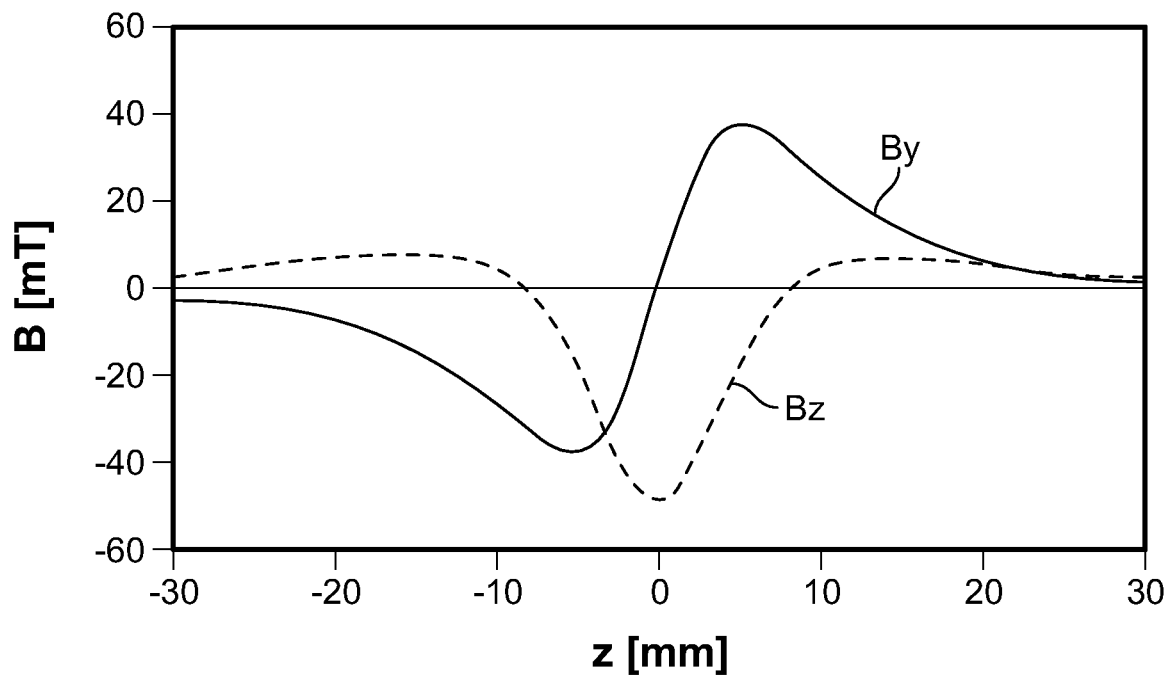
FIG. 14 is a graph of generated magnetic field components as a function of a position of a permanent magnet with respect to the Hall-effect sensor of FIG. 13.
Figure 15:
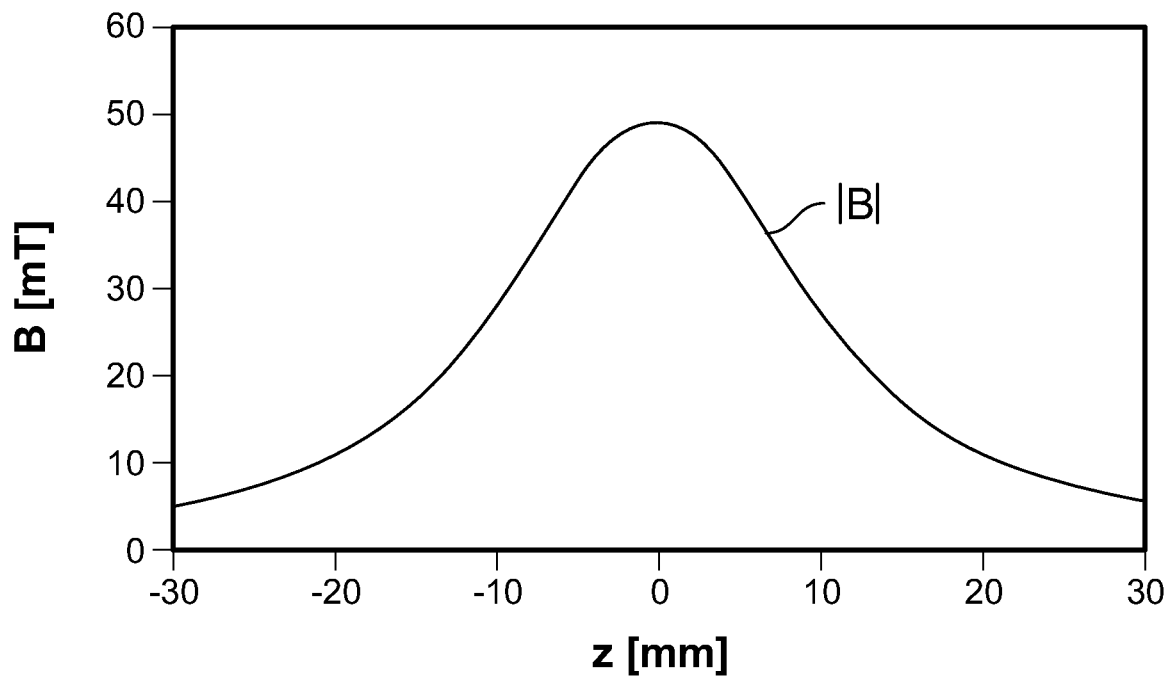
FIG. 15 is a graph of a magnetic flux calculated from the generated magnetic field components of FIG. 14.
Figure 16:
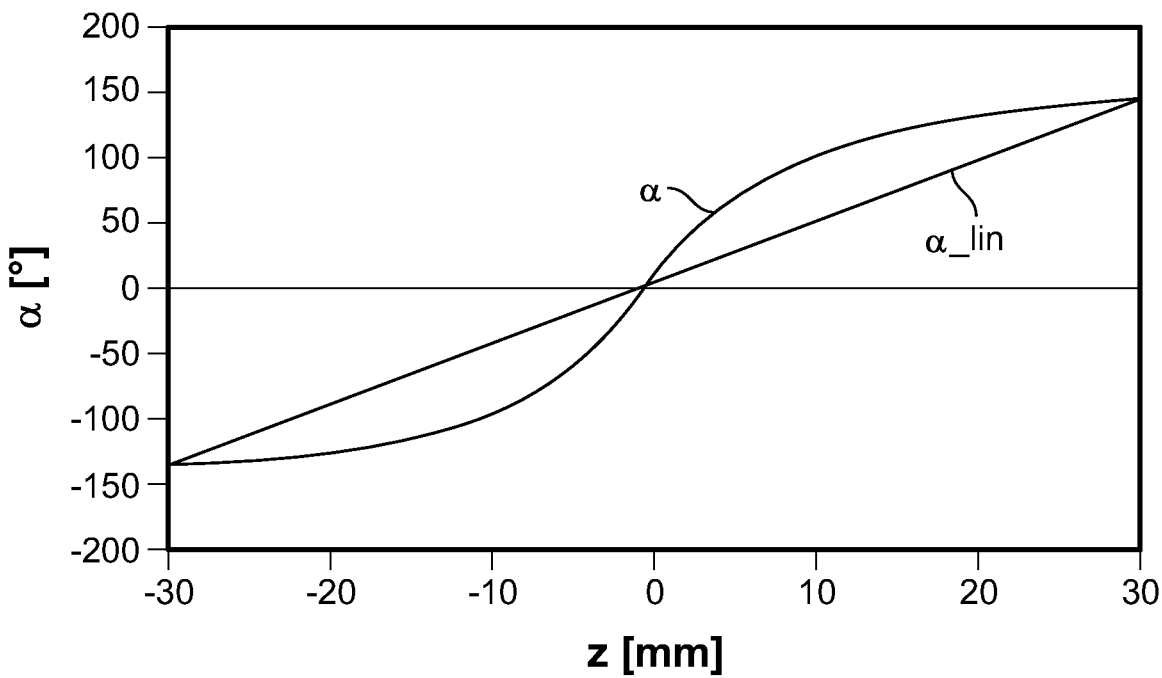
FIG. 16 is a graph of a curve of an angle calculated from the generated magnetic field components of FIG. 14 and the curve of a linearized angle.
Figure 17:
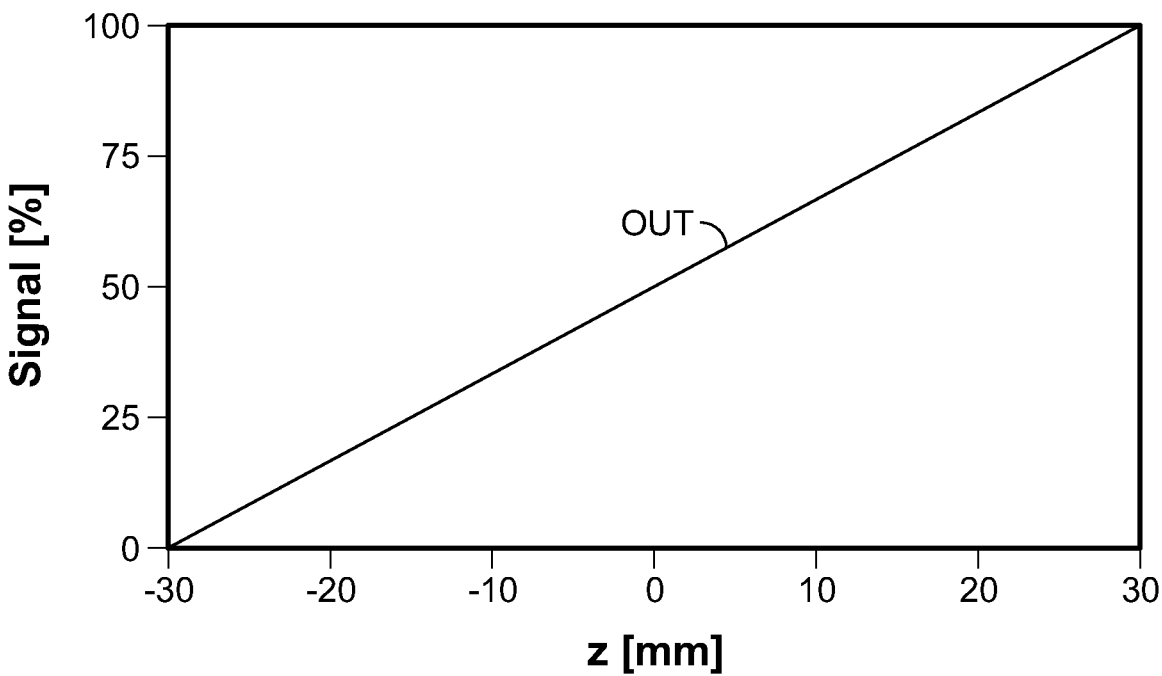
FIG. 17 is a graph of an output signal of the Hall-effect sensor of FIG. 13.

In general principle, a displacement sensor arrangement according to the present invention functions as explained with respect to FIG. 13; a magnetic field sensor is fixedly assembled, while a permanent magnet 102 is mounted to be movable linearly (or along a curved path) with respect to the magnetic field sensor. The permanent magnet 102 is polarized for example such that its north/south axis is oriented parallel to the movement direction. The principles of the present invention are generally also applicable to arrangements in which the permanent magnet 102 is polarized such that its north/south axis runs transversely to the movement direction. The permanent magnet 102 can be displaced from the zero position shown in FIG. 1 in two directions by a travel distance 104 defined by the respective application. The principles according to the invention can also be applied to other magnetic field sources, for example, electromagnets, and to magnetic field sensors such as magnetoresistive sensors or inductive sensors.

In the present description, on the one hand the values of the magnetic field in the movement direction Bz, and on the other hand the values of the magnetic field transversely to the movement direction By are used as magnetic field components measured in dependence on the position of the permanent magnet 102 Of course, the Bx values which run orthogonally to By can also be used for the calculation.

Figure 1:
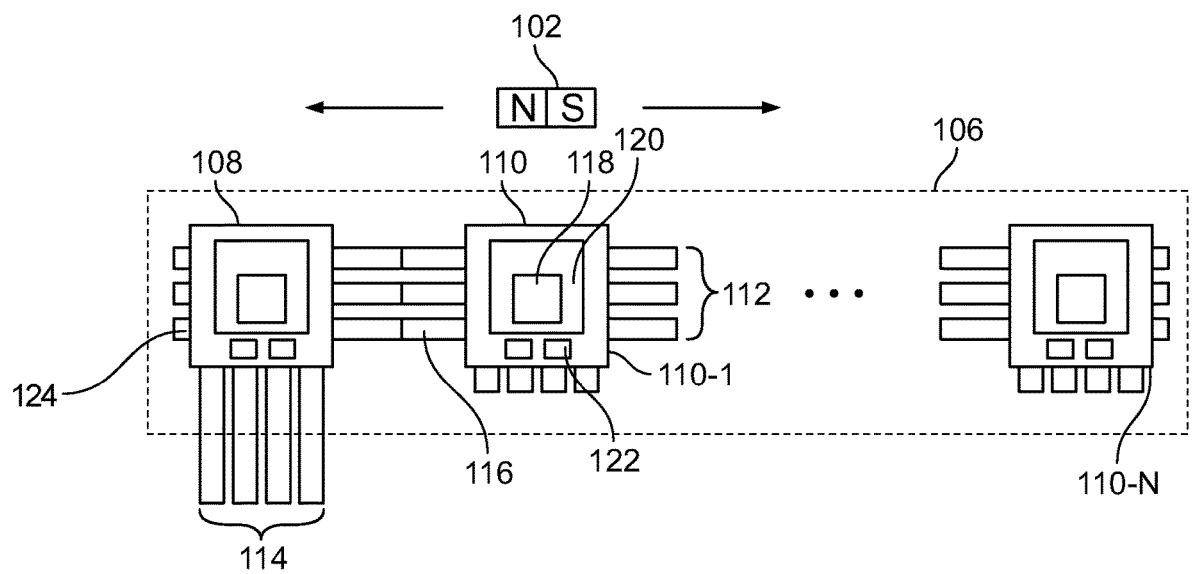
FIG. 1 is a schematic diagram of a displacement sensor according to an embodiment.

A compact and autonomous magnetic field sensor arrangement 106 according to an embodiment of the invention shown in FIG. 1 is able to cover an extended measuring range. The sensor arrangement 106 includes a first magnetic field sensor 108 configured as master (hereinafter designated simply as "master") and one or more second magnetic field sensors 110 configured as slaves (hereinafter designated simply as "slave") to be connected to each other via a data bus 112. If a plurality of second magnetic field sensors 110-1 to 110-N are provided, these can be connected to each other in series, as shown in FIG. 1. According to an exemplary embodiment, seven magnetic field sensors 110-1 to 110-7 configured as slaves are thus connected to each other in a cascade, wherein a signal path is provided both from the master 108 to the slaves 110 and from the slaves 110 to the master 108.

As shown in FIG. 1, the magnetic field sensors 108, 110 are connected to each other directly via a leadframe which forms individual lines 116 of the data bus 112. The plurality of second magnetic field sensors 110 are arranged in series along a displacement path of the magnetic field source 102. The displacement sensor according to the invention including the permanent magnet 102 and the sensor arrangement 106 can thus be adapted in a flexible manner to a great variety of spatial conditions. Not only linear movements can be detected over relatively long, straight distances, but also rotation movements wherein the magnetic field sensors 110 are arranged along a radius around the rotation axis of a moving part. Therefore, a PCB is no longer required and the magnetic field sensor arrangement 106 is particularly robust and can be extensively miniaturized. With each individual magnetic field sensor 108, 110, a measuring range of approximately 30 mm can be covered. By cascading a plurality of individual sensors, a correspondingly greater detectable measuring range can be achieved. For example, in an embodiment, when using a first magnetic field sensor 108 and seven second magnetic field sensors 110-1 to 110-7, a maximum measuring range of approximately 240 mm can be covered.

Figure 2:
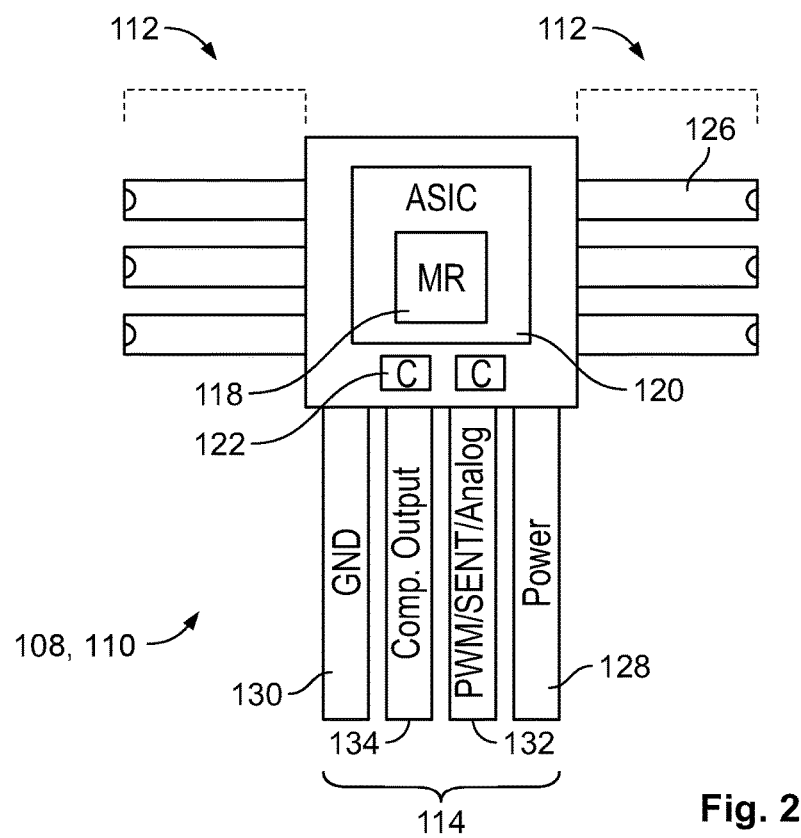
FIG. 2 is a schematic diagram of a magnetic field sensor of the displacement sensor of FIG. 1.

As shown in FIG. 1, the magnetic field sensor arrangement 106 has an input/output interface 114 which links the magnetic field sensor arrangement 106 to external components. As shown in FIG. 2, the input/output interface 114 serves, on the one hand, to connect the magnetic field sensor arrangement 106 to ground 130 and an external power supply 128 and, on the other hand, to output an output signal which reflects the position of the magnet 102. The output signal here, as is also usual in the case of conventional displacement sensors, can be either an analog signal, a pulse width modulation (PWM) signal or a binary coded signal (according to the SENT protocol, for example). Power is supplied for example by a direct current voltage of 4 V to 16 V. It is clear to the person skilled in the art that, in another embodiment, the measurement data can be transmitted to the outside with wireless technology, such as a radio connection. The energy which is required for operation of the magnetic field sensors 108, 110 can also be supplied contactlessly (for example, by inductive coupling or energy harvesting).

In the embodiment shown in FIG. 1, all magnetic field sensors 108, 110 are constructed identically. Each magnetic field sensor has a magnetic field probe 118 which detects the magnetic field and is arranged on an application specific integrated circuit (ASIC) 120. In an embodiment, the magnetic field probe 118 is the transducer element which carries out the physical conversion of the magnetic input variable into an electrical signal. Each magnetic field sensor 108, 110 includes an evaluation unit for evaluating an output signal of the magnetic field probe 118 and a communication interface for emitting and receiving a plurality of communication signals. The first magnetic field sensor 108 and the second magnetic field sensor 110 are connected to each other via the data bus 112 for transmitting the communication signals The ASIC 120 has further electronic circuits, for example a control unit, a communication unit, memory units, and, where applicable, voltage converters and stabilizing circuits. Discrete components such as capacitors 122 can also be provided.

In the embodiment of FIG. 1, three connecting lines 116 are provided which form the data bus 112. The data bus 112 is bidirectional. However, the number of connecting lines 116 can of course be adapted to the particular requirements of the bus format and bus protocol such that more or fewer lines 116 are also possible. The magnetic field sensors 108, 110 are according to the invention connected with each other in series in a cascade such that the data which is transmitted over the bus 112 is looped through all bus participants respectively. Nevertheless, by providing lines 116 which run correspondingly parallel at the leadframe, a parallel or a combined serial/parallel bus 112 connecting the magnetic field sensors 110-1 to 110-N configured as slaves to each other and to the magnetic field sensor 108 configured as master is also achievable. Examples of possible data bus protocols are, as mentioned, the SPI (serial peripheral interface), I²C (inter-integrated circuit) or SENT (single edge nibble transmission) protocols. The SENT protocol is defined as unidirectional output protocol; for communicating between the magnetic field sensor 108 configured as master and the magnetic field sensor(s) 110 configured as slave, a second bidirectional interface is thus required for the communication.

The magnetic field probe 118 can be based on any conventional physical principle which is suitable for detecting the magnetic field. A Hall-effect sensor or a magnetoresistive (MR) sensor, e.g. an anisotropic magnetoresistive (AMR) sensor, a tunnel magnetoresistive (TMR) or a giant magnetoresistive (GMR) sensor, can for example be employed as a magnetic field probe 118. In the event that GMR technology is used, there is no need for magnets of rare earths since a high degree of accuracy can already be guaranteed for a standard ferromagnet when using a GMR probe.

The anisotropic magnetoresistive effect (AMR) occurs in ferromagnetic materials, the resistivity of which changes with the angle between the magnetic field direction and the current direction. The change in resistance amounts to a small percentage and is useful even with weak magnetic fields. In the case of the TMR effect (tunnel magnetoresistive) the tunnel resistance changes between two ferromagnetic layers, depending on the angle of the magnetization of the two layers. The giant magnetoresistive effect (GMR) was only discovered in 1988. The electrical resistance of two thin ferromagnetic layers, separated by a thin non-magnetic layer, changes depending on the angle of the magnetization in the two ferromagnetic layers to each other and produces changes in resistance of up to 50%. The electrical resistance is the highest in the case of antiparallel magnetization. The change in resistance is not dependent on the current direction. When several layers with different properties and magnetizations are stacked, the characteristics of GMR sensors are determined by their construction. This enables a targeted adaptation of the characteristics to the requirements for a particular measurement application.

The master 108 and the slaves 110 can be formed by identical magnetic field sensors. The configuration as master 108 or slave 110 takes place automatically according to the invention, in that during a configuration step it is determined whether the respective connecting lines 116 are unconnected or connected. If, for example corresponding to the arrangement in FIG. 1 for a magnetic field sensor 108, 110, it is determined that the terminals on its left side as seen from above are unconnected terminals 124, it is established that it is intended to be a master. By contrast, if the terminals located on the left side represent connecting lines 116, the corresponding magnetic field sensor 108, 110 is configured as slave. During an automatic addressing routine, the address "0x0" can be assigned to the master. The further magnetic field sensors 108, 110 then receive the address of the adjacent magnetic field sensor+"0x1".

The master 108 includes a signal processing unit which is able to process the signals of all the magnetic field probes of the array, i.e. the probes in the slaves 110 and its own probe, and generate an output signal therefrom which reflects the position of the permanent magnet 102. The communication between the master 108 and the slaves 110 takes place via the communication bus 112 connected to the ICs. The slaves 110 must have at least one magnetic field probe 118, a device for analogue to digital conversion, and a digital communication interface for internal communication. The master 108, along with the magnetic field probe 118, the device for analogue to digital conversion, and the digital communication interface, also contains a signal processing unit for combining all sensor signals and a robust output driver unit for outputting the calculated output signal to an external control unit. Furthermore, the master 108 comprises a device for connecting the magnetic field sensor arrangement 106 to an external power supply unit.

The magnetic field sensor arrangement 106 according to the invention needs only the magnetic field sensors 108, 110 and, in another embodiment, does not require any evaluation units. External devices for overvoltage protection, for signal stabilization, for ensuring the electromagnetic compatibility (EMC) or for protecting against electrostatic discharge (ESD) are not necessary either, since the magnetic field sensors 108, 110 according to the invention include all the required components.

Although the principles according to the invention can also be implemented using commercial magnetic field sensors (see the embodiments of FIGS. 3-10), the invention proposes the magnetic field sensor 108, 110 which is particularly suitable for arrangement in an array, as shown in greater detail in FIG. 2.

As shown in FIG. 2, terminals 126 are provided for connecting to further magnetic field sensors 108, 110 via the data bus 112, which terminals 126 can be welded to a leadframe, for example. Further components, such as capacitors 122 or resistors, can be integrated in the magnetic field sensor 108, 110 as required. The magnetic field probe 118 and the further electronic components can be arranged on the same semiconductor module or on separate modules which are connected to each other.

In the embodiment shown in FIG. 2, the input/output interface 114 comprises four terminals. A power supply terminal 128 can be connected to an external power supply unit. A ground terminal 130 enables connection to an external reference potential, and an output terminal 132 outputs the output signal calculated in the magnetic field sensor 108, 110. The output signal can be a pulse width modulated (PWM) signal, for example, in the case of which the duty factor encodes the information to be output via the measured magnetic field. Alternatively, an analogue signal, for example an analogue voltage signal, or a digital signal, for example a signal according to the SENT protocol already mentioned, can also be output. A complementary output terminal 134 supplies an output signal which is complementary to the output signal (for example, an inverted output signal). In the array shown in FIG. 1, the terminals 126 or 114 which are not required in each case remain unconnected.

Figure 3:
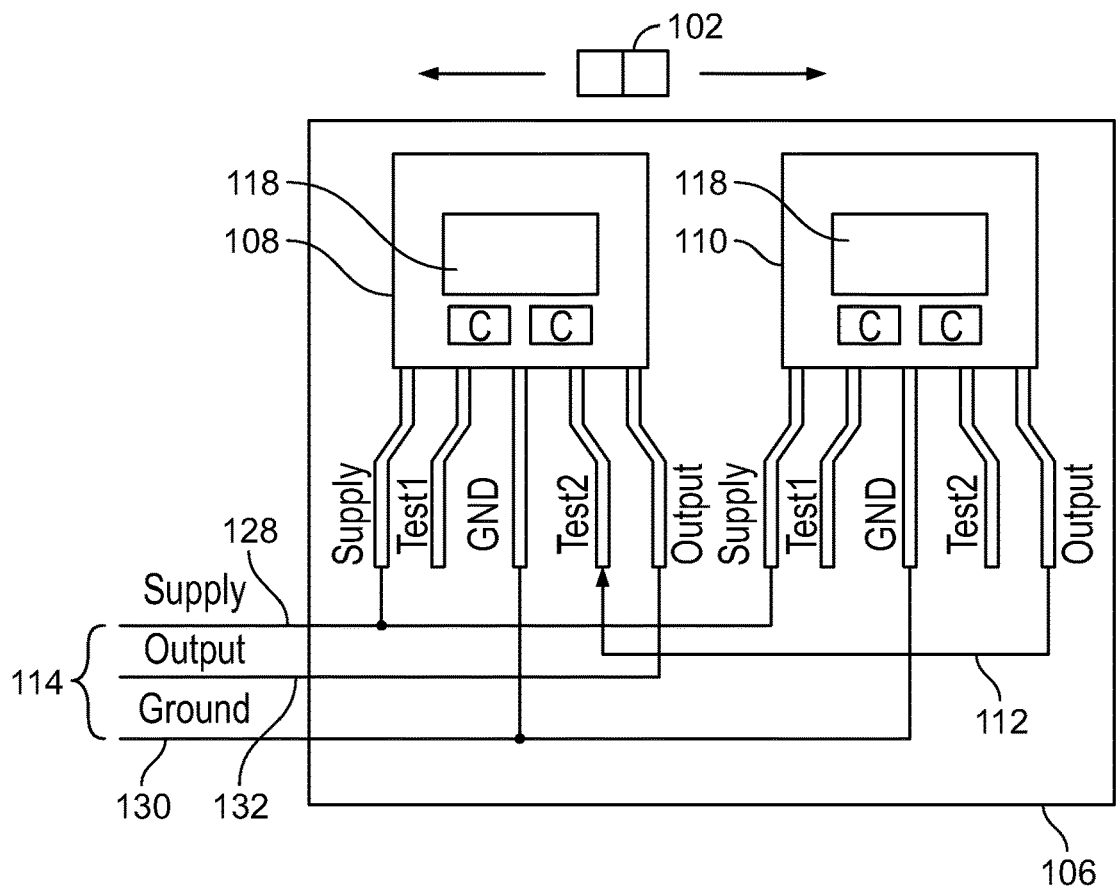
FIG. 3 is a schematic diagram of a displacement sensor according to another embodiment.

A displacement sensor according to another embodiment, as shown in FIG. 3, comprises a permanent magnet 102 and a magnetic field sensor arrangement 106 with a first magnetic field sensor 108 and a second magnetic field sensor 110. The first magnetic field sensor 108 and the second magnetic field sensor 110 are formed by identical components, for example Hall-effect sensors. Each of the two magnetic field sensors 108, 110 has five terminals: a supply terminal (Supply) and a ground terminal (GND), an output terminal (Output) and two test terminals (Test1 and Test2) which enable both input and output of signals. A three-dimensional Hall-effect sensor can for example be used as a magnetic field probe 118.

In the embodiment shown in FIG. 3, the input/output interface 114 comprises only three terminals, namely the power supply terminal 128, the ground terminal 130, and the output terminal 132. The two magnetic field sensors 108, 110 are, according to the arrangement shown in FIG. 3, wired up such that the first magnetic field sensor 108 is configured as master, while the second magnetic field sensor 110 is configured as slave. The measuring signals are transmitted from the output of the magnetic field sensor 110 via the communication bus 112, for example according to a SENT protocol, to the magnetic field sensor 108 acting as master.

In the embodiment of FIG. 3, the master 108 evaluates the data of the slaves 110 together with the data of its own magnetic field probe 118, and thus a doubled measuring range, in comparison with that of an individual sensor, can be achieved. Further, the connections between the two magnetic field sensors 108, 110 and to the input/output interface can take the form of a leadframe. If both magnetic field sensors 108, 110 include integrated EMC/ESD protection circuits respectively, no PCB is required.

Figure 4:
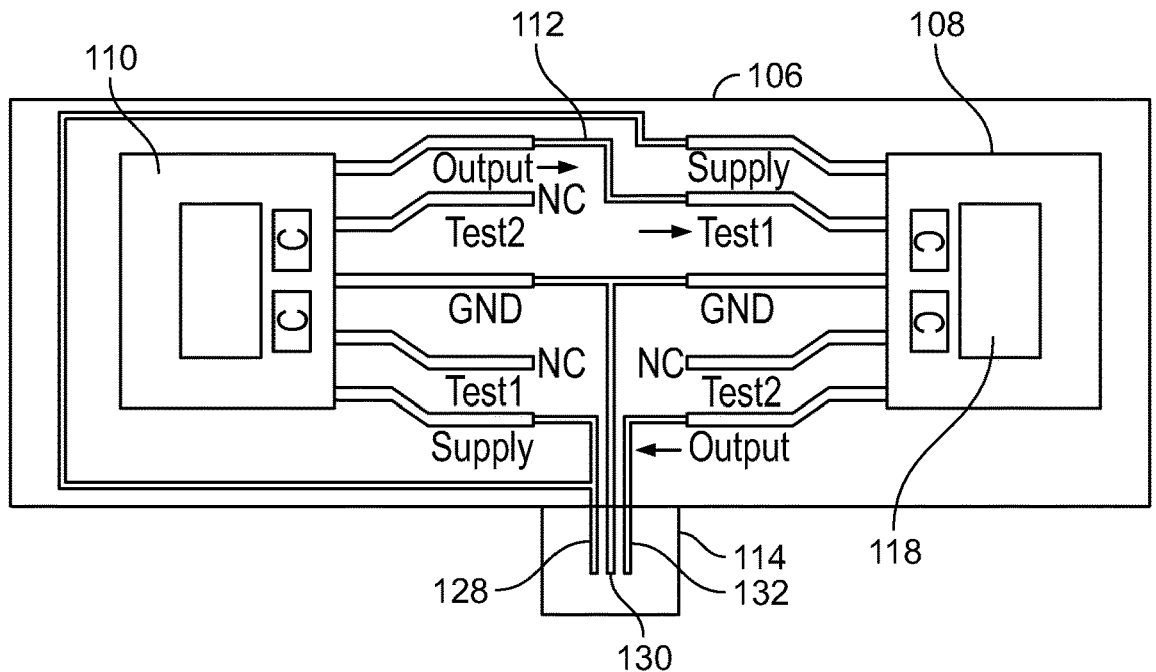
FIG. 4 is a schematic diagram of a magnetic field sensor arrangement according to another embodiment.

In another embodiment shown in FIG. 4, the master-slave arrangement shown in FIG. 3 has a mechanical solution. The two magnetic field sensors 108, 110 are arranged such that their terminals face each other.

Figure 5:
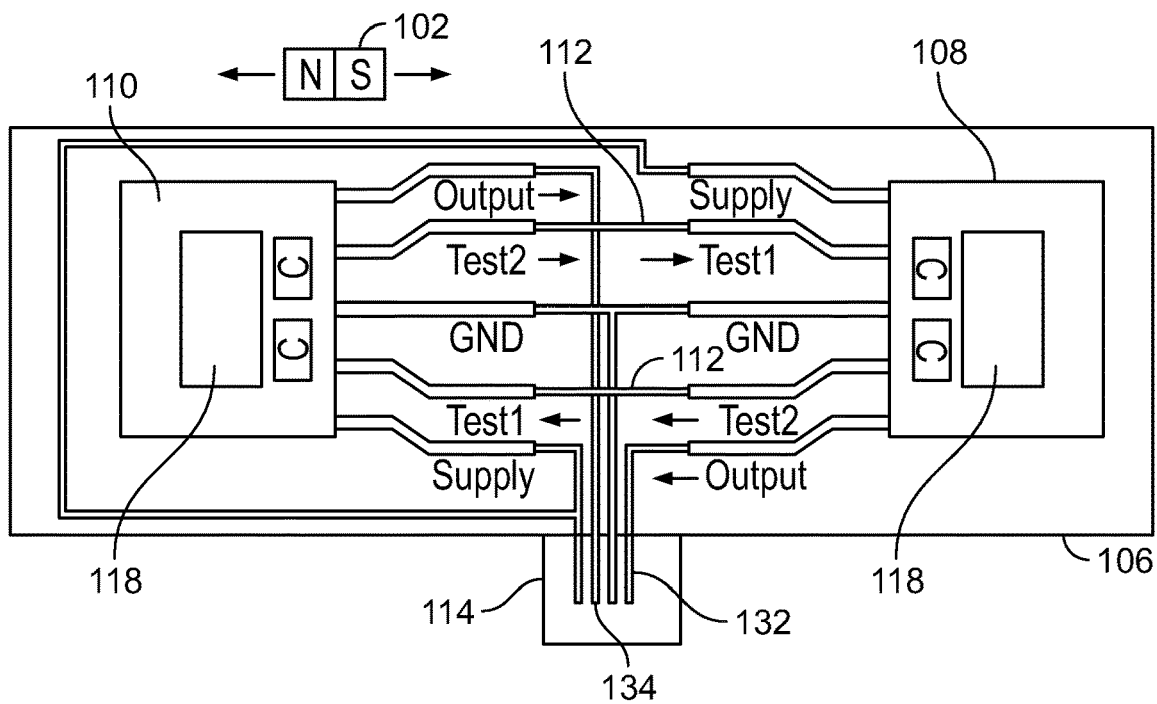
FIG. 5 is a schematic diagram of a displacement sensor according to another embodiment.

In another embodiment shown in FIG. 5, the first magnetic field sensor 108 and the second magnetic field sensor 110 are wired up to form a multimaster architecture. Each of the two magnetic field sensors 108, 110 acts as both master and slave. As is evident in FIG. 5, both magnetic field sensors 108, 110 perform a magnetic field measurement. The generated measuring signals are transmitted via the data bus lines 112 to the respectively other magnetic field sensor. Each of the two magnetic field sensors 108, 110 includes a calculating unit which calculates the position of the permanent magnet 102 from the combination of the two measuring signals and generates a corresponding output signal. The input/output interface 114 is constructed such that the actual position signal is output on the output terminal 132, while the output signal which is complementary thereto is located on the complementary output 134. In such an embodiment, an additional fault monitoring possibility is created by the obtained redundancy. A mutual signal evaluation can take place and thus a redundant output signal can be generated; the complementary output signal is redundant to the output signal.

FIG. 1-5, it should be noted, are not to scale and in particular do not reflect the relative dimensions of the permanent magnet 102 and the individual magnetic field sensors, and the terminals and interfaces.

Figure 6:
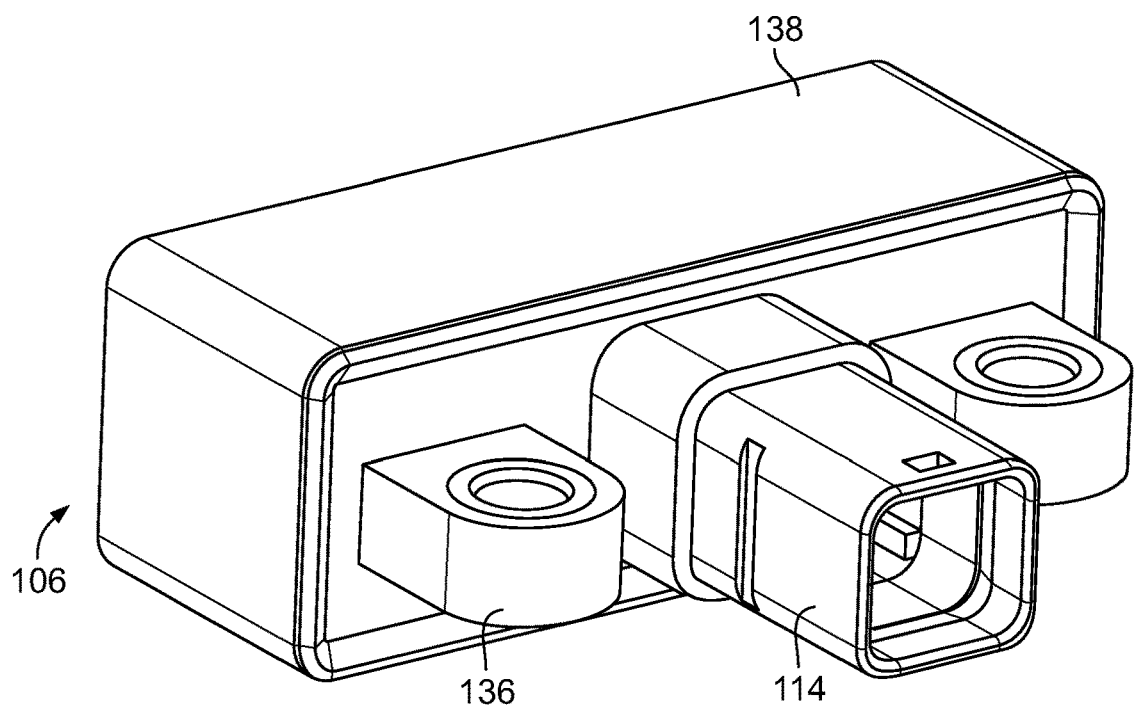
FIG. 6 is a perspective view of a magnetic field sensor arrangement according to an embodiment.

The mechanical implementation of a magnetic field sensor arrangement 106 is shown in FIG. 6. The input/output interface 114 is constructed as a so-called NanoMQS plug connector. Fixing devices 136 enable the magnetic field sensor arrangement 106 to be fastened to a further component, for example with the help of a screw connection. The magnetic field sensor arrangement 106 is advantageously hermetically protected in an electrically insulating housing 138. The housing 138 encloses all the magnetic field sensors 108, 110 for protecting the magnetic field sensor arrangement 106 from outside influences, in order to prevent dirt, gases and moisture from entering.

A production of the magnetic field sensor arrangement 106 will be explained in detail hereinafter with reference to FIGS. 7-10.

Figure 7:
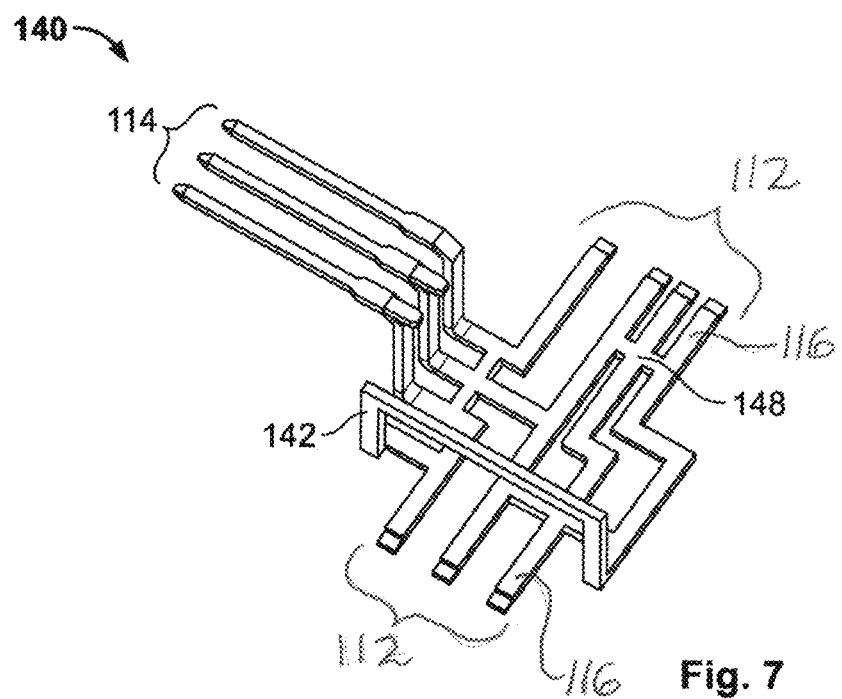
FIG. 7 is a perspective view of a leadframe of the magnetic field sensor arrangement of FIG. 6.

A production method for a magnetic field sensor arrangement 106 according to the present invention begins with the provision of a leadframe 140 shown in FIG. 7, which also illustrates a perspective view of an embodiment of a leadframe 140 as described with reference to FIGS. 1-5. The leadframe 140 is produced from metal by stamping and bending, for example. In the shown embodiment, the leadframe 140 has a three-dimensional shape and includes both the internal connecting lines and the terminals of the input/output interface 114 which are directed outwards. An additional reinforcing bracket 142 ensures greater mechanical stability. The conductor tracks, which are actually separate, are still connected to each other by connecting webs 148. FIG. 7 also illustrates the connecting lines or lead lines 116 that are part of the bus 112 that connect the first sensor 108 and second sensor 110, as described with reference to FIGS. 1-5.

Figure 8:
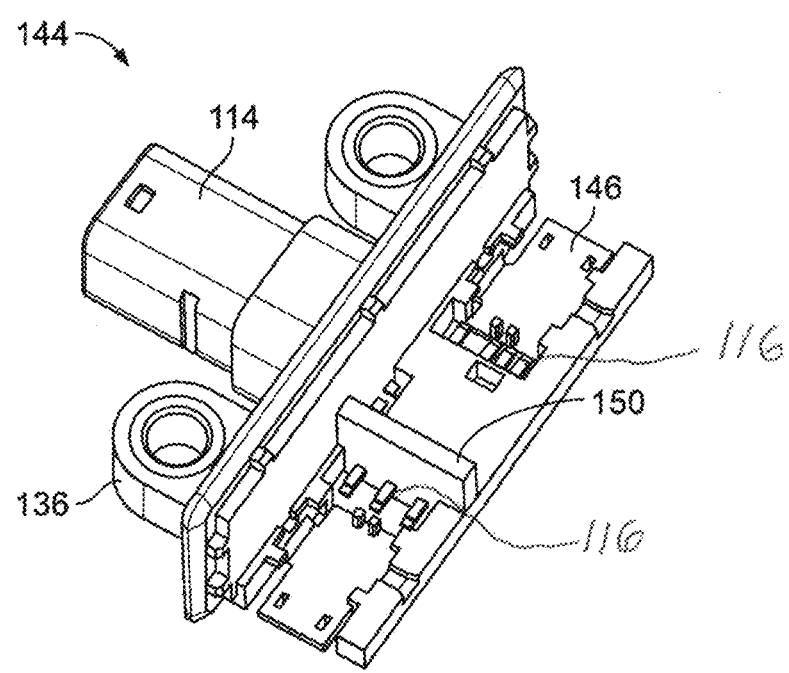
FIG. 8 is a perspective view of the leadframe of FIG. 7 with a molded plastic.

In a next step, shown in FIG. 8, the leadframe 140 has plastic injection molded around it such that a carrier 144 is formed. The complete plug connector for the input/output interface 114 and the fixing devices 136 are already formed on the carrier 144. Receptacles 146 enable the subsequent assembly of the magnetic field sensors 108, 110. The reinforcing bracket 142 binds a reinforcing rib 150 to the plastic material surrounding it. After the leadframe 140 is molded in, the connecting webs 148 are removed. The individual lines of the leadframe 140 are thus electrically and mechanically separated from each other.

Figure 9:
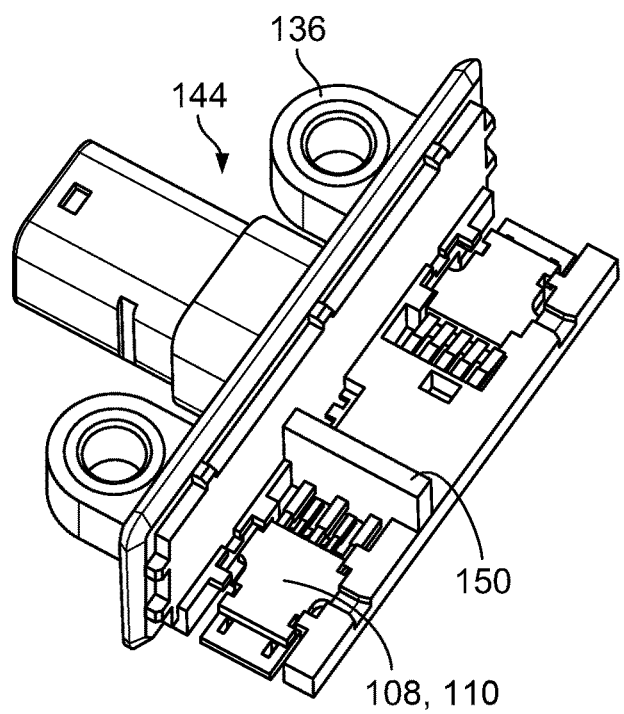
FIG. 9 is a perspective view of a carrier assembled with magnetic field sensors.

FIG. 9 shows the carrier 144 after assembly of the magnetic field sensors 108, 110. The individual contacts of the magnetic field sensors 108, 110 are welded to terminals of the leadframe 140, for example via laser welding. In other embodiments, other possibilities for the electrical connection, such as soldering, are of course also usable. The use of leadframes 140 enables a geometrically precise alignment of the magnetic field sensors 108, 110 with respect to each other and with respect to the fixing devices 136 which determine the position accuracy during later installation in the application environment.

Figure 10:
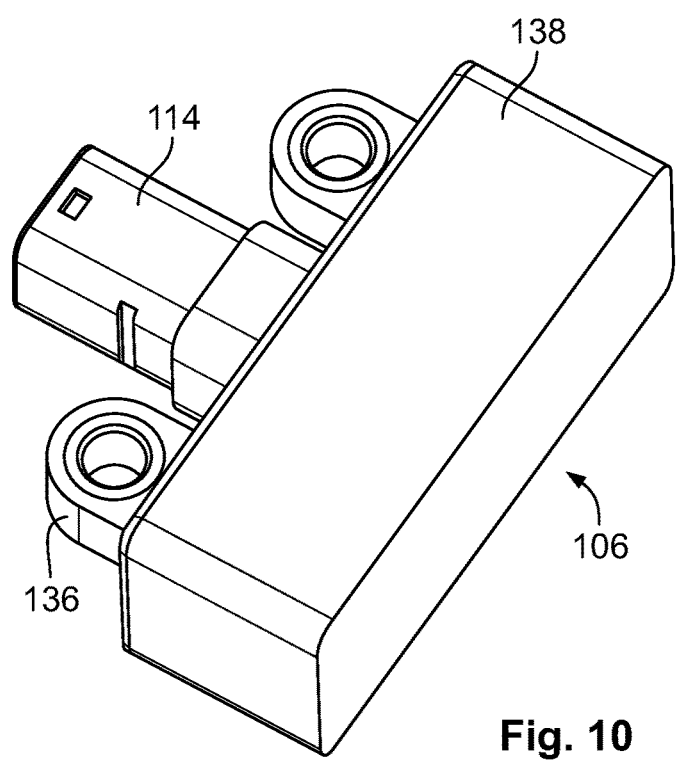
FIG. 10 is another perspective view of the magnetic field sensor arrangement of FIG. 6.

To conclude the production process, as shown in FIG. 10, the sensor 108, 110 is hermetically sealed with the help of a cover cap 138 which forms the housing. The mechanical connection between the carrier 144 and the cover cap 138 can take place, for example, via laser welding or ultrasonic welding. Other possibilities such as an adhesive bond are of course also usable.

Figure 11:
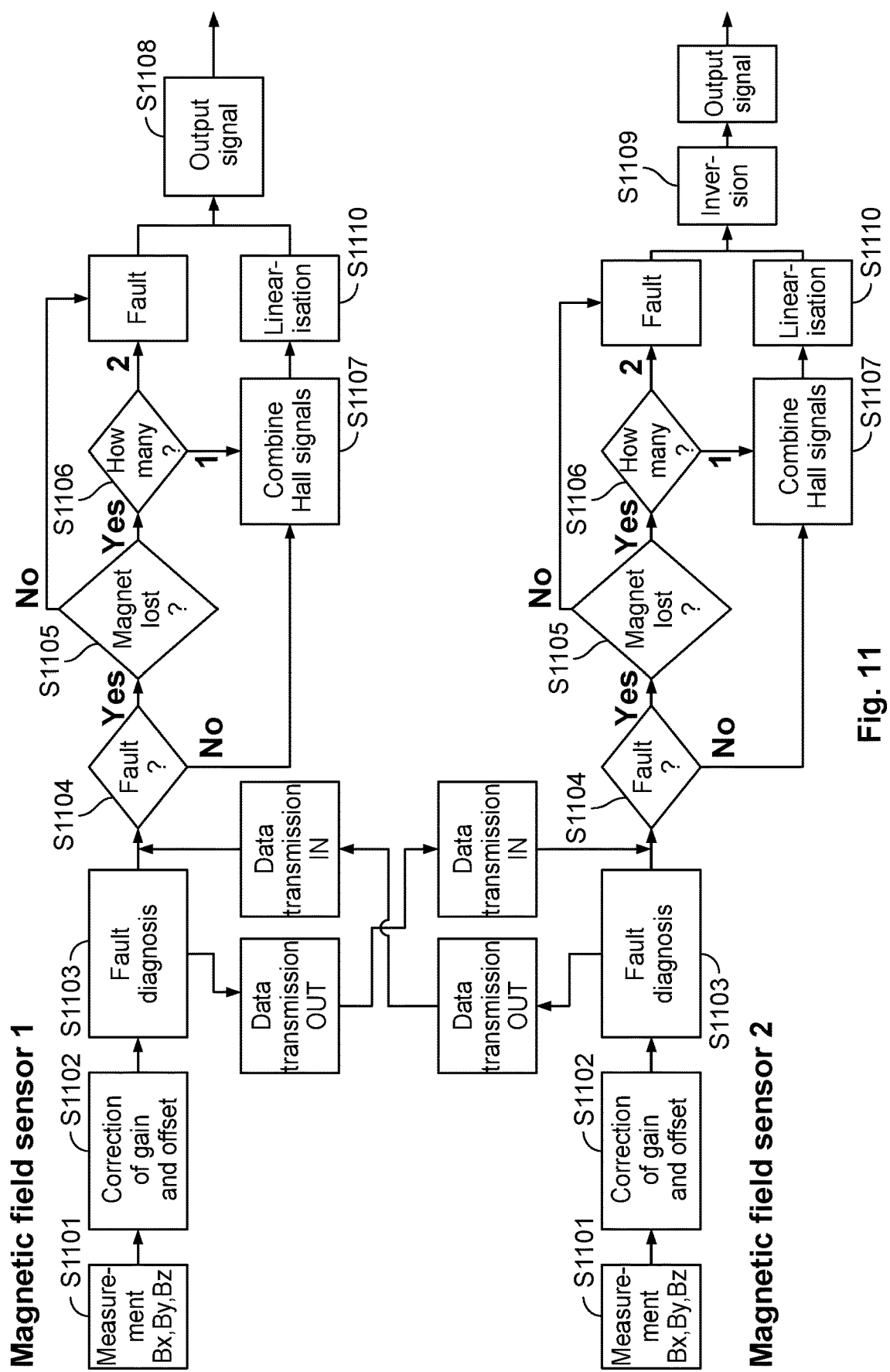
FIG. 11 is a flowchart of a measurement procedure of the displacement sensor of FIG. 5.

FIG. 11 schematically shows, in the form of a signal flowchart, the evaluation of the sensor architecture from FIG. 5 in the event that the first magnetic field sensor 108 and the second magnetic field sensor 110 each have a 3D Hall probe as a magnetic field probe 118.

In a first step (S1101), each Hall probe 118 detects the three components Bx, By and Bz of the magnetic field which is generated by the permanent magnet 102. In the following step S1102, a correction of the gain and the offset is carried out by each of the two magnetic field sensors 108, 110. In step S1103, the generated signal is transmitted to the respectively other magnetic field sensor for a fault diagnosis, and it is determined whether or not a fault is present (S1104). If no fault is detected or if the fault is based on the fact that precisely one of the two magnetic field sensors can no longer detect the magnet (steps S1105 and S1106), the two Hall-effect signals generated in step S1102 are combined in each of the magnetic field sensors 108, 110 (step S1107) and the signal is linearized (S1110). Finally, the first magnetic field sensor 108 outputs the output signal in step S1108. By contrast, the second magnetic field sensor 110 performs an inversion of the signal (S1109) such that the complementary output signal is output by the second magnetic field sensor 110. These two redundant signals can be evaluated for fault monitoring.

Figure 12:
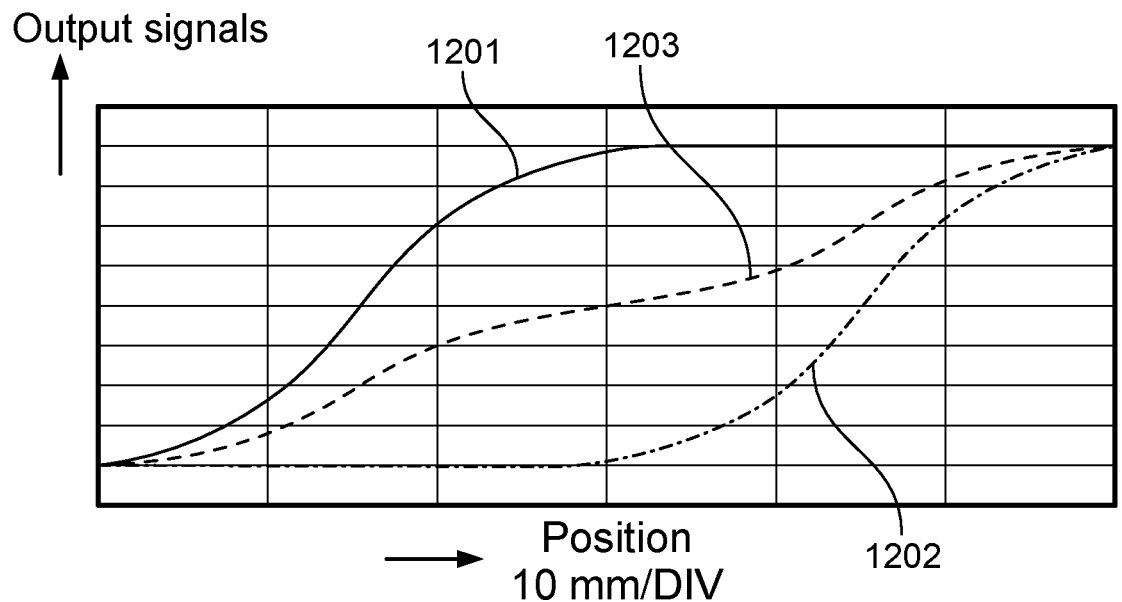
FIG. 12 is a graph of measuring signals of a magnetic field sensor arrangement with two Hall-effect sensors.

The inventive combination of the signals of two Hall-effect sensors 108, 110, as is apparent in FIG. 12, generate an approximately linear signal across a larger position range. In FIG. 12, the curve 1201 represents the output signal of the first magnetic field sensor 108, while the curve 1202 indicates the output signal of the second magnetic field sensor 110. By combining the two signals 1201 and 1202, the overall signal 1203 is obtained. This overall signal 1203 is calculated by the sum of the two individual signals divided by 2.

Connecting the magnetic field sensors 108, 110 via the data bus 112 combines a number of magnetic field sensors, which can be selected in a flexible manner where applicable, to form a highly integrated magnetic field sensor arrangement 106, without the necessity for a separate control and calculating unit, in order thus to cover an extended measuring range. The magnetic field sensor arrangement 106 can be adapted simply and at low cost to particular application requirements, in particular with respect to the path length which is to be detected. Due to the fact that each magnetic field sensor 108, 110 includes all the components required for its operation and for complying with the EMC/ESD and electrical requirements, no further components are required, so the magnetic field sensor arrangement 106 according to the invention has no need of a printed circuit board (PCB). The magnetic field sensor arrangement 106 according to the invention is, in comparison with known sensor platforms, more reliable and more robust, needs fewer parts, costs less to produce, and takes up less overall space.

What is claimed is:

1. A system, comprising:
a magnetic field source generating a magnetic field; and
a magnetic field sensor arrangement adapted to contactlessly detect a relative position of the magnetic field source with respect to the magnetic field sensor arrangement, the magnetic field source movable relative to the magnetic field sensor arrangement, the magnetic field sensor arrangement includes a first magnetic field sensor adapted to generate a first position signal and a second magnetic field sensor adapted to generate a second position signal, wherein the first magnetic field sensor is configured as a master and the second magnetic field sensor is identical to the first magnetic field sensor, and wherein each of the first magnetic field sensor and the second magnetic field sensor has a magnetic field probe adapted to detect a magnetic flux density of the magnetic field, the magnetic field probe of each of the first magnetic field sensor and the second magnetic field sensor detecting a same plurality of components of the magnetic field, each of the first magnetic field sensor and the second magnetic field sensor has an evaluation unit, the evaluation unit of the first magnetic field sensor configured to evaluate an output signal of the magnetic field probe of the first magnetic field sensor and the evaluation unit of the second magnetic field sensor configured to evaluate an output signal of the magnetic field probe of the second magnetic field sensor, and each of the first magnetic field sensor and the second magnetic field sensor has a communication interface for emitting and receiving a plurality of communication signals,
wherein the first magnetic field sensor and the second magnetic field sensor are connected to each other by one or more connecting lines of a data bus formed as part of a leadframe, the leadframe further including an input/output interface, each of the data bus and input/output interface defining their own respective plane and an integral reinforcing bracket defining a second plane not parallel to the plane of the data bus and not parallel to the plane of the input/output interface, and
wherein each of the first magnetic field sensor and the second magnetic field sensor has an output terminal to transmit a first output signal via the input/output interface and a complementary output terminal to transmit a second output signal via the input/output interface, wherein the first output signal and the second output signal are redundant.

2. The system of claim 1, wherein the second magnetic field sensor is one of a plurality of second magnetic field sensors of the magnetic field sensor arrangement arranged in series along a displacement path of the magnetic field source.

3. The system of claim 1, wherein the magnetic field source has a permanent magnet.

4. The system of claim 1, wherein the magnetic field probe of the first magnetic field sensor and the magnetic field probe of the second magnetic field sensor is a two-dimensional Hall-effect sensor, a three-dimensional Hall-effect sensor, or a magnetoresistive sensor.

5. The system of claim 1, wherein the first magnetic field sensor has an output driver unit adapted to output the output signal of the magnetic field probe of the first magnetic field sensor based on the first position signal and the second position signal.

6. The system of claim 5, wherein the magnetic field sensor arrangement has a housing enclosing the first magnetic field sensor and the second magnetic field sensor.

7. A method for producing a magnetic field sensor arrangement for a displacement sensor adapted to contactlessly detect a relative position of a magnetic field source generating a magnetic field with respect to the magnetic field sensor arrangement, comprising:

producing a three-dimensional leadframe having (a) an input/output interface, (b) a data bus comprising connecting lines and one or more connecting webs between the connecting lines, all integrally connected and each of the data bus and the input/output interface defining their own respective planes, and (c) an integral reinforcing bracket defining a second plane not parallel to the plane of the data bus and not parallel to the plane of the input/output interface;

injection molding a plastic around the leadframe to form a carrier, wherein the reinforcing bracket is embedded within a reinforcing rib of the carrier that is disposed between and separates a plurality of receptacles of the carrier from one another, and wherein the input/output interface and data bus extend away from the reinforcing rib and free ends of the data bus extend into the receptacles;

removing the connecting webs after the forming the carrier;

assembling a first magnetic field sensor and a second magnetic field sensor in the receptacles of the carrier after forming the carrier, wherein the input/output interface includes a terminal for external connection and the data bus includes a bidirectional connection between the first magnetic field sensor and the second magnetic field sensor; and enclosing the magnetic field sensor arrangement in a housing by forming a hermetic seal between a cover cap and the carrier.

\* \* \* \* \*